(12) United States Patent
Nakagawa

(10) Patent No.: US 8,669,310 B2
(45) Date of Patent: Mar. 11, 2014

(54) POLYAMIDE RESIN COMPOSITION REINFORCED WITH GLASS FIBER

(75) Inventor: Tomohide Nakagawa, Ohtsu (JP)

(73) Assignee: Toyo Boseki Kabushiki Kaisha, Osaka (JP)

( * ) Notice: Subject to any disclaimer, the term of this patent is extended or adjusted under 35 U.S.C. 154(b) by 0 days.

(21) Appl. No.: 13/142,096

(22) PCT Filed: Jan. 29, 2010

(86) PCT No.: PCT/JP2010/000533
§ 371 (c)(1),
(2), (4) Date: Jun. 24, 2011

(87) PCT Pub. No.: WO2010/087192
PCT Pub. Date: Aug. 5, 2010

(65) Prior Publication Data
US 2011/0263777 A1    Oct. 27, 2011

(30) Foreign Application Priority Data
Jan. 29, 2009    (JP) .................................. 2009-017987

(51) Int. Cl.
*C08K 3/40*    (2006.01)
(52) U.S. Cl.
USPC .......................................... 524/261; 524/494
(58) Field of Classification Search
USPC .......................................... 524/492, 261, 494
See application file for complete search history.

(56) References Cited

U.S. PATENT DOCUMENTS

| | | | |
|---|---|---|---|
| 2008/0167415 A1* | 7/2008 | Stoeppelmann et al. | 524/494 |
| 2008/0274355 A1* | 11/2008 | Hewel | 428/402 |
| 2010/0069539 A1* | 3/2010 | Morimoto et al. | 524/100 |

FOREIGN PATENT DOCUMENTS

| | | |
|---|---|---|
| JP | 2-173047 | 7/1990 |
| JP | 7-18186 | 1/1995 |
| JP | 2002-294200 | 10/2002 |
| JP | 2003-112952 | 4/2003 |
| JP | 2004-84128 | 3/2004 |
| JP | 2004-168849 | 6/2004 |

(Continued)

OTHER PUBLICATIONS

Form PCT/IB/338 dated Aug. 18, 2011 together with International Preliminary Report on Patentability and English translation of PCT Written Opinion in International (PCT) Application No. PCT/JP2010/000533.

(Continued)

*Primary Examiner* — John Uselding
(74) *Attorney, Agent, or Firm* — Wenderoth, Lind & Ponack, L.L.P.

(57) ABSTRACT

There is provided a polyamide resin composition reinforced with glass fiber produced by the melt kneading of a mixture where 60 to 80 parts by weight of glass fiber bundles (B) comprising a glass fiber having a flat cross section whose flatness degree is 1.5 to 8 and having an ignition loss at 625° C. for 0.5 hour of not more than 0.8% by weight are added to 40 to 20 parts by weight of polyamide (A), characterized in that, during the above melt kneading, a polyamide-reactive silane coupling agent (C) is added to the above mixture in a rate of 0.1 to 1.0% by weight of the above glass fiber bundles (B). The polyamide resin composition of the present invention has high bending strength, bending elastic modulus and Charpy impact strength (at 23° C. and −40° C.) by a specific fracture mode which have been never achieved before, and it is excellent in productivity.

11 Claims, 5 Drawing Sheets

An example of projected image obtained by subjecting the image of the fractured part of the test piece to a binarizing treatment

(56) References Cited

FOREIGN PATENT DOCUMENTS

| JP | 2004-285487 | 10/2004 |
|---|---|---|
| JP | 2005-350501 | 12/2005 |
| JP | 2006-45390 | 2/2006 |
| JP | 2007-302866 | 11/2007 |
| JP | 2008-163340 | 7/2008 |
| JP | 2008-291192 | 12/2008 |
| WO | 2007/080754 | 7/2007 |
| WO | 2008/068898 | 6/2008 |

OTHER PUBLICATIONS

International Search Report issued Mar. 30, 2010 in International (PCT) Application No. PCT/JP2010/000533.

* cited by examiner (1-1)

Test piece: length 80 mm × width of the notch portion 8 mm (normal portion 10mm) × thickness 4 mm (1-2)

Schematic view of test piece whose fracture proceeds in a direction vertical to the lengthwise direction:

(1-3)

Schematic view of test piece which includes fracture in the lengthwise direction:

An example of projected image obtained by subjecting the image of the fractured part of the test piece to a binarizing treatment (3 — 1) Examples of fracture of the product of the present invention (Examples 1 and 5)

(3 — 2) A SEM photograph taken from the above area of the fractured surface (Example 5)

(3 — 3) An enlarged SEM photograph of the fractured surface (Example 5)

(4 — 1) Examples of fracture of Comparative Example 4

(4 — 2) A SEM photograph taken from the above area of the fractured surface (4 — 3) An enlarged SEM photograph of the fractured surface (5-1)

(5-2)

Charpy test image

Hammer impact

POLYAMIDE RESIN COMPOSITION REINFORCED WITH GLASS FIBER

This application is the National Stage of International Application No. PCT/JP2010/000533, filed on Jan. 29, 2010, which claims priority to Japanese Patent Application No. JP-2009-017987, filed on Jan. 29, 2009.

TECHNICAL FIELD OF THE INVENTION

The present invention relates to a polyamide resin composition reinforced with glass fiber in which adhesion of a polyamide resin to a glass fiber having a flat cross section is improved using a silane coupling agent whereby a high mechanical characteristic is achieved.

BACKGROUND ART

Polyamide resin is able to express not only high rigidity and high tenacity but also high deflectability under loading when it is reinforced with glass fiber. Therefore, a polyamide resin composition reinforced with glass fiber is widely used as interior and exterior materials in the fields of electronic/electric devices and automobiles. In recent years, the level for the demanded elastic modulus is becoming high due to making the thickness of the product thin particularly in the field of electronic/electric devices and there has been a demand for a polyamide resin composition having excellent rigidity and impact resistance.

The Patent Document 1 discloses a polyamide resin composition which comprises a polyamide resin and a glass fiber having an elongate cross section whose flatness degree is not less than 2.5, where the content of the glass fiber is not less than 50% by weight. According to the Comparative Examples of this document however, it is mentioned that, when the content of the glass fiber becomes 70% by weight or more, extrusion is no longer possible and, in addition, rigidity such as bending elastic modulus is not so sufficient in spite of high filling amount of the glass fiber. Accordingly, the level is to be still improved for achieving a sufficient thinning of the thickness of the product.

The Patent Document 2 discloses a polyamide material for molding which expresses a high Charpy impact strength by combining a polyamide resin having low viscosity with a glass fiber having a non-circular cross section. According to the Examples of this document however, description is limited only to polyamide 11, polyamide 12 and polyamide 66 having a high flexibility and, the same as in the Patent Document 1, expression of the bending elastic modulus is still in a level which is to be improved for achieving a sufficient thinning of the thickness of the product.

PRIOR ART DOCUMENTS

Patent Documents

Patent Document 1: Japanese Patent Application Laid-Open (JP-A) No. 2007-302866
Patent Document 2: Japanese Patent Application Laid-Open (JP-A) No. 2008-163340
Patent Document 3: Japanese Patent Application Laid-Open (JP-A) No. 2004-285487
Patent Document 4: Japanese Patent Application Laid-Open (JP-A) No. 2008-291192
Patent Document 5: Japanese Patent Application Laid-Open (JP-A) No. 2004-84128
Patent Document 6: Japanese Patent Application Laid-Open (JP-A) No. 2003-112952
Patent Document 7: Japanese Patent Application Laid-Open (JP-A) No. 2002-294200

DISCLOSURE OF THE INVENTION

Problem that the Invention is to Solve

The present invention has been devised and created in view of the above-mentioned current status of the prior art and its object to provide a polyamide resin composition having high mechanical characteristics or, particularly, excellent rigidity and impact resistance and further showing a specific fracture mode in the impact resistance.

Means for Solving the Problem

The present inventor has carried out extensive investigations for achieving such an object and, as a result, he has found that, when a silane coupling agent is added during melt kneading of a mixture of a specific polyamide resin with a glass fiber having a flat cross section so that the polyamide and the glass fiber are strongly bonded with each other, it is now possible to give a polyamide resin composition which abundantly contains the glass having a flat cross section and has high mechanical characteristics whereupon the present invention has been accomplished.

Thus, the present invention adopts the following constitutions.

(1) A polyamide resin composition reinforced with glass fiber produced by the melt kneading of a mixture where 60 to 80 parts by weight of glass fiber bundles (B) comprising a glass fiber having a flat cross section whose flatness degree is 1.5 to 8 and having an ignition loss at 625° C. for 0.5 hour of not more than 0.8% by weight are added to 40 to 20 parts by weight of polyamide (A), characterized in that, during the above melt kneading, a polyamide-reactive silane coupling agent (C) is added to the above mixture in a rate of 0.1 to 1.0% by weight of the above glass fiber bundles (B).

(2) The polyamide resin composition reinforced with glass fiber according to (1), wherein the polyamide resin (A) is constituted from an aliphatic polyamide (a1) and a polyamide (a2) containing aromatic components, and their constituting ratio by weight is (5 to 95):(95 to 5).

(3) The polyamide resin composition reinforced with glass fiber according to (2), wherein the polyamide (a2) containing the aromatic components contains poly-m-xylylene adipamide which has a relative viscosity in a 96% sulfuric acid solution of 1.4 to 1.8 and has a terminal carboxyl group concentration of not higher than 50 meq/kg.

(4) The polyamide resin composition reinforced with glass fiber according to (2) or (3), wherein the aliphatic polyamide (a1) contains polycaproamide which has a relative viscosity in a 96% sulfuric acid solution of 1.4 to 2.0 and has a terminal carboxyl group concentration of 55 to 90 meq/kg.

(5) The polyamide resin composition reinforced with glass fiber according to any of (1) to (4), wherein the bending elastic modulus (in accordance with ISO 178) is not less than 23 GPa.

(6) The polyamide resin composition reinforced with glass fiber according to any of (1) to (4), wherein, in the fractured surface of the test piece of the polyamide resin composition reinforced with glass fiber after the Charpy impact strength test (in accordance with ISO 179-1; cutting notch portion), the area ratio of the apparent surface area (SA) of the fractured surface to the cross sectional area (SB) of the notch portion is not less than 2.5.

The apparent surface area (SA) of the fractured surface: area which is calculated by (fracture length from the front end of the notch portion to the opposite side surface of the notch portion)×(thickness of the test piece)

The cross sectional area (SB) of the notch portion: area which is calculated by (width of the notch portion)×(thickness of the test piece)

Advantages of the Invention

Since the polyamide resin reinforced with glass fiber according to the present invention is produced by addition of a silane coupling agent during melt kneading of the polyamide resin with the glass fiber having a flat cross section, adhesion of the resin to the glass fiber is strong and, even when the glass fiber is filled in high amount, an extrusion processing is possible in a stable manner. As a result, the polyamide resin composition reinforced with the glass fiber according to the present invention has a high rigidity that the bending elastic modulus is not less than 23 GPa, has a high energy absorption characteristic upon the fracture due to the expression of a specific impact fracture mode and shows little temperature dependency of the impact resistance whereby it is able to show the characteristic that the impact resistance at the temperature of as low as −40° C. is the same as or even more than the impact resistance at 23° C. Therefore, the polyamide resin composition reinforced with glass fiber according to the present invention is very suitable for thinning the polyamide resin products reinforced with glass fiber.

BEST MODE FOR CARRYING OUT THE INVENTION

Figure 1:
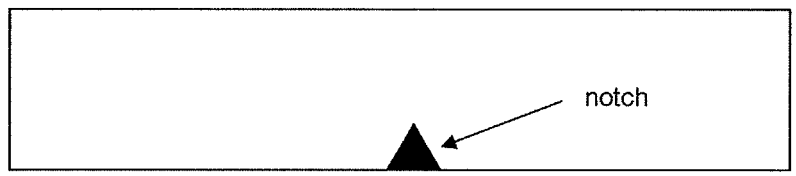
FIG. 1 is diagrams which schematically show a test piece for impact strength and the fractured states of the test piece after the impact strength test. (1-1) shows a test piece for Charpy impact strength test equipped with a notch portion formed by cutting, (1-2) shows a fractured state of the test piece of Comparative Example after the impact strength test and (1-3) shows the fractured state of the test piece of the present invention.
Figure 1:
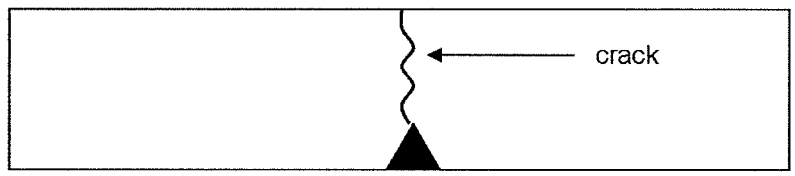
Figure 1:
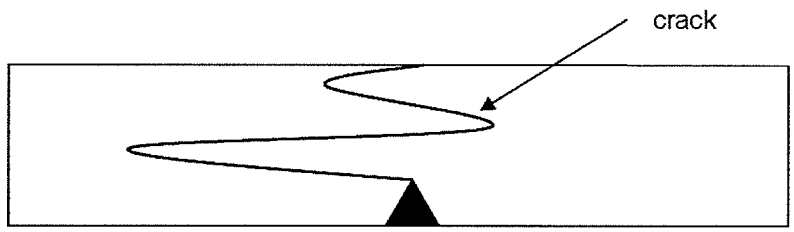

The polyamide resin composition reinforced with glass fiber of the present invention is produced by the melt kneading of a mixture where 60 to 80 parts by weight of glass fiber bundles (B) comprising a glass fiber having a flat cross section whose flatness degree is 1.5 to 8 and having an ignition loss at 625° C. for 0.5 hour of not more than 0.8% by weight are added to 40 to 20 parts by weight of polyamide resin (A), and it is characterized in that, during the above melt kneading, a polyamide-reactive silane coupling agent (C) is added to the above mixture in a rate of 0.1 to 1.0% by weight of the above glass fiber bundles (B).

The polyamide resin (A) is a polyamide resin produced by polycondensation of lactam, ω-aminocarboxylic acid, dicarboxylic acid, diamine, etc. as the materials or is a copolymerized product or a blended product thereof. Examples of the lactam and the ω-aminocarboxylic acid include ω-caprolactam, 6-aminocaproic acid, ω-enantolactam, 7-aminoheptanoic acid, 11-aminoundecanoic acid, 9-aminononanoic acid, α-pyrrolidone and α-piperidine. Examples of the dicarboxylic acid include terephthalic acid, isophthalic acid, adipic acid and sebacic acid. Examples of the diamine include tetramethylenediamine, hexamethylenediamine, m-xylylenediamine, p-xylylenediamine, undecamethylenediamine, dodecamethylenediamine, 2-methylpentamethylenediamine, trimethylhexamethylenediamine, aminoethylpiperazine and bisaminomethylcyclohexane.

In order to satisfy that the polyamide resin (A) has a high bending elastic modulus and a high impact resistance at the same time, it is preferred to use the aliphatic polyamide (a1) and the polyamide (a2) having an aromatic component by mixing them in a ratio by weight of (5 to 95):(95 to 5), respectively. It is preferred that the polyamide resin for injection molding has the crystallinity of more than a predetermined degree. Therefore, the ratio by weight of (a1):(a2) is preferred to be from 5:95 to 40:60 in view of molding property and heat resistance when the polyamide (a2) having an aromatic component is crystalline while, when the polyamide (a2) having an aromatic component is not crystalline, the ratio by weight of (a1):(a2) is preferred to be from 95:5 to 60:40 in view of the molding property and the productivity.

With regard to the polyamide (a2) having an aromatic component, the preferred one is a polyamide resin which expresses a high elastic modulus, adjusts the solidifying speed and improves the strand property during the production and the metal die transfer property during the injection molding. With regard to the polyamide (a2) having an aromatic component, examples thereof include a polyamide 6T/6I produced from terephthalic acid, isophthalic acid and adipic acid, a polyamide 6T/66 produced from terephthalic acid, adipic acid and hexamethylenediamine and a polyamide MXD6 (poly-m-xylylene adipamide) produced from m-xylylenediamine and adipic acid. Considering compatibility, strength-expressing property, tenacity-holding property and rigidity-expressing property when the polyamide (a1) and the polyamide (a2) are used together, the polyamide MXD6 is preferred. When a crystalline polyamide such as MDX6 which contains xylylenediamine as a component is used as a main component, it is particularly preferred to use, as a part of (a2), m-xylyleneadipamine having a relative viscosity of 1.4 to 1.8. Although the m-xylyleneadipamide having a relative viscosity of 1.4 to 1.8 has a good fluidity, it is very fragile and also has a low impact strength whereby its reaction with a silane coupling agent on the glass fiber surface is not preferred. Accordingly, when the m-xylyleneadipamide having relative viscosity of 1.4 to 1.8 is used, the preferred manner is to use the m-xylylenadipamide having a relative viscosity of 1.4 to 1.8 and having a terminal carboxyl group amount of not more than 50 meq/kg in such an adding amount that the terminal carboxyl group concentration (CEG: meq/kg) of the polyamide resin (A) satisfies the range of 10 to 95 meq/kg so that no reaction with the coupling agent takes place.

When the polyamide (a2) having an aromatic component is noncrystalline, the aliphatic polyamide (a1) is preferred to contain a polycaproamide which has a relative viscosity in a 96% sulfuric acid solution of 1.4 to 2.0 and has a terminal carboxyl group concentration of 55 to 95 meq/kg. As a result, it is now possible to enhance the productivity in highly filling the glass fiber having a flat cross section and the fluidity of the resin composition during molding and to improve the appearance of the molded product while the tenacity in some degree is still able to be maintained. Polyamide 6, polyamide 66, polyamide 46, etc. are preferred as the aliphatic polyamide (a1) in view of molding property, heat resistance, tenacity, rigidity, etc.

Polyamide 6, polyamide 66, polyamide 46, polyamide MXD6, polyamide 6T/6, polyamide 6T/66, and a blended product thereof are preferred as the polyamide resin (A) in view of molding property, heat resistance, tenacity, rigidity, etc. and, for satisfying the high bending elastic modulus, it is particularly preferred that the polyamide MXD6 is used as a main component and polyamide 6 or polyamide 66 is blended therewith.

For achieving an efficient reaction of the polyamide resin (A) with a polyamide-reactive silane coupling agent (C), the molecular terminal of the polyamide (A) has carboxyl group or amino group. To be more specific, the terminal carboxyl group concentration (CEG: meq/kg) of the polyamide resin (A) is preferred to be 10 to 95 meq/kg and more preferred to be 55 to 90 meq/kg. Although the poly-m-xylyleneadipamide having a relative viscosity in a 96% sulfuric acid solution of 1.4 to 1.8 is good in terms of the fluidity, it is very fragile and its impact strength is also low whereby it is preferred that, when this poly-m-xylyleneadipamide is contained, the terminal carboxyl group amount is not more than 50 meq/kg so that no coupling with the glass fiber takes place.

The polyamide resin composition of the present invention is produced via a step where a mixture comprising the polyamide resin (A) and the glass fiber bundles (B) is subjected to a melt kneading and the rate of the polyamide resin (A) to the glass fiber bundles (B) in this mixture is in a ratio by weight of 40:60 to 20:80, and preferably in a ratio by weight of 38:62 to 24:76. When the rate of the glass fiber bundles (B) is less than the above range, a sufficient mechanical strength may not be expressed while, when it is more than the above range, production and molding may not be achieved.

The glass fiber having a flat cross section used for the glass fiber bundles (B) includes that where the cross section being vertical to the lengthwise direction of the fiber is nearly elliptic, nearly long circular and nearly cocoon shapes and the flatness degree thereof is 1.5 to 8. Here, the term "flatness degree" is the ratio of the long diameter to the short diameter when a rectangle with the smallest area contacting the outside of the cross section vertical to the lengthwise direction of the glass fiber is supposed and the length of the long side of this rectangle is named the long diameter and the length of the short side thereof is named the short diameter. When the flatness degree is less than 1.5, there is no big difference in terms of the shape from the glass fiber having a circular cross section and, therefore, there are some cases where the impact resistance of the molding product is not so much enhanced. On the other hand, when the flatness degree is more than 8, the bulk density in the polyamide resin is high and, therefore, there are some cases where the uniform dispersing in the polyamide is not available and there are also some cases where the impact resistance of the molded product is not so much enhanced. In the present invention, the glass fiber having a nearly long circular cross section whose flatness degree is 2 to 5 is particularly preferred since it expresses a high mechanical characteristic. Although there is no particular limitation for the diameters of the glass fiber, the short diameter and the long diameter are about 1 to 20 µm and 2 to 100 µm, respectively. As to the glass fiber, a fiber bundle in a chopped strand form being cut into fiber lengths of about 1 to 20 mm is preferable used.

In producing the polyamide resin composition of the present invention, it is necessary that, during the melt kneading of a mixture comprising the polyamide resin (A) and the glass fiber bundles (B), a polyamide-reactive silane coupling agent (C) is added to the mixture in a rate of 0.1 to 1.0% by weight of the glass fiber bundles (B). As shown in the Patent Documents 3 to 7, the glass fiber is usually used as a reinforcing agent for polyamide in a chopped strand form after being bundled by a converging agent followed by cutting into a predetermined length. In the converging agent for the chopped strand for the polyamide, a small amount of the silane coupling agent is previously contained for enhancing the adhesive property to the matrix resin. However, with regard to the amount of the aminosilane coupling agent which can be previously attached to the fiber bundles, there is an upper limit so that the fiber bundles do not result in poor opening during extrusion and it is preferably 0.05 to 0.2 part by weight to 100 parts by weight of the glass fiber.

The content of silane coupling agent in the glass fiber bundles is evaluated by using a non-volatile component at 125° C. as an index. When the non-volatile component at 125° C. is 100 parts by weight, the content of the silane coupling agent is 2 to 20 parts by weight. The non-volatile component of the chopped strand at 125° C. can be quantified by means of the ignition loss at 625° C. for 0.5 hour after the moisture is dried off and, in the glass fiber bundles for the reinforcement of polyamide, it is usually about 0.2 to 1.5% by weight. When the ignition loss is less than 0.2% by weight, it means that the amount of the converging agent for bundling the fiber bundles is small and, during the production, opening happens resulting in troubles in the production. Moreover, since the amount of the silane coupling agent is small, no wetting property with the resin can be sufficiently ensured. When the ignition loss is more than 1.5% by weight, opening of the fiber bundles hardly takes place and a poor dispersing into the resin is resulted. Further, the components which do not contribute in the adhesive property to the resin become gaseous during the extrusion and, therefore, the production becomes difficult particularly when a large amount of the glass fiber is added as in the case of the present invention. Particularly, in the case of the chopped strand of the glass fiber having a flat cross section, the flat surfaces are overlapped each other and, as a result, poor opening is apt to happen as compared with the case of the glass fiber bundles having flat cross sections when the amount of the converging agent become much more. Due to the above, the amount of the converging agent for the glass fiber bundles having flat cross sections is suppressed to the level of about 0.2 to 0.8% by weight in terms of ignition loss at 625° C. for 0.5 hour. The amount of the silane coupling agent contained in the fiber bundles at that time is 0.01 to 0.16% by weight to the glass fiber bundles. Such a small amount of the silane coupling agent is unable to sufficiently keep the adhesion of the glass fiber having a flat cross section to the polyamide resin when large amount of the glass fiber is used as in the present invention.

When adhesion of the flat surface of the glass fiber having a flat cross section to the polyamide of the matrix resin is poor, there happens a phenomenon where the strand is cut during extrusion of the melt kneaded mixture using a extruder even if the fiber is opened and dispersed. Such a phenomenon is significant particularly when the amount of the glass fiber contained therein is as high as not less than 60% by weight. In the common biaxial extruders, it is quite difficult to make into pellets when the glass fiber having a flat cross section is not less than 60% by weight and, even if the pellets are obtained, there are significant unbalanced shape and poor opening, fluffing, etc. of the glass fiber in the resulting pellets which thrust into the molding machine during the molding giving a poor product whereupon there is resulted a significant reduction in the productivity in both terms of kneading/extrusion property and molding property. Due to those reasons, there may be the case where the amount of the silane coupling agent which can be previously adhered to the glass fiber is not sufficient for expressing the wetting property to the polyamide. Particularly when the glass having a flat cross section is filled therein as highly as not less than 60% by weight, the total interfacial area between the glass and the polyamide becomes large whereby it is necessary to newly add a polyamide-reactive silane coupling agent during the melt kneading in order to express the properties of high degree. In the present invention, a polyamide-reactive silane coupling agent (C) is directly added to a mixture of the polyamide resin (A) and the glass fiber bundles (B) during the melt kneading in addition to the coupling agent which is previously adhered in small amount to the commercially available glass fiber (chopped strand) having a flat cross section being controlled under the ignition loss of not more than 0.8% by weight at 625° C. for 0.5 hour. As a result thereof, a high rigidity which has not been possible is now able to be achieved even if the glass fiber having a flat cross section is filled in a high rate and, further, a stable extrusion is possible.

In addition, the flat surface of the glass fiber having a flat cross section is apt to be orientated in the surficial direction of the molded product and such an aligning phenomenon greatly affects the properties. Thus, in case the coupling of the polyamide resin with the glass fiber is poor, there is resulted poor adhesion or defect between the interfaces of the glass fiber and the polyamide resin when the flat surface of the glass fiber is orientated in the surficial direction whereupon the intended high rigidity and high properties are not achieved even if the glass fiber having a flat cross section is highly filled therewith. In accordance with the present invention, however, since the coupling between the glass fiber surface and the polyamide resin is good, the adhesive property of the glass fiber with the polyamide resin is enhanced and, at the same time, the surface reinforcing effect due to the surface orientation of the glass fiber having a flat cross section is added thereto whereby a specific fracture mode is expressed in the molded product and the efficiency for the absorption of impact energy is enhanced.

The polyamide-reactive silane coupling agent (C) is a coupling agent which has a functional group being reactive with the polyamide and is able to chemically react with carboxyl group or amino group which are terminal groups of the polyamide resin (A). For example, an aminosilane coupling agent having amino group, an epoxysilane coupling agent having epoxy group, etc. can be used. Among them, the aminosilane coupling agent is particularly preferred in view of the interfacial adhesion of the glass fiber with the polyamide. Examples of the aminosilane coupling agent include 3-aminopropyl trimethoxysilane, 3-aminopropyl triethoxysilane, 3-(2-aminoethyl)aminopropyl trimethoxysilane and 3-(2-aminoethyl)aminopropyl triethoxysilane.

Adding amount of the polyamide-reactive silane coupling agent (C) during the melt kneading to a mixture of the polyamide resin (A) and the glass fiber bundles (B) is 0.1 to 1.0% by weight and preferably 0.1 to 0.8% by weight of the glass fiber bundles (B). When the adding amount is less than the above range, the effect for improving the mechanical characteristic is little while, when it is more than the above range, gas becomes abundant whereby there may the case where the inconveniences during the production and the molding happen.

In the polyamide resin composition of the present invention, it is also possible to compound an inorganic filler and an improving agent for weather resistance such as carbon black, copper halide compound and/or alkali metal halide, light- or heat-stabilizer such as a phenol-type antioxidant or a phosphorus-type antioxidant, releasing agent, crystal nucleating agent, lubricant, flame retardant, antistatic agent, pigment, dye, etc. therewith in addition to the above-mentioned polyamide resin (A), glass fiber bundles (B) and silane coupling agent (C) within such an extent that the characteristic of the present invention is not inhibited.

An example of the method for the production of the polyamide resin composition of the present invention is a method where a mixture comprising the polyamide resin (A) and the glass fiber bundles (B) in a ratio by weight of from 40:60 to 20:80 is prepared and then, under the state where at least a part of the above polyamide resin (A) is melted, the polyamide-reactive silane coupling agent (C) is added to the melted mixture in an amount of 0.1 to 1.0% by weight to the glass fiber bundles (B) whereupon a melt kneading is conducted together therewith. To be more specific, it is possible to adopt a method where the components (A) and (B) are pre-blended using a blender and poured into a uniaxial or biaxial melt kneading extruder from a hopper; or the components (A) and (B) are poured into a uniaxial or biaxial melt kneading extruder using a feeder and then the component (C) as a liquid is added to the melted mixture according to a side-feeding process under the state where at least a part of (A) is melted.

It is likely in the present invention that the polyamide-reactive silane coupling agent (C) contacts the glass fiber bundles (B) during the kneading and many of the agent reacts with the glass fiber surface and, at the same time, the polyamide resin (A) is apt to contact the glass fiber bundles (B) since the melt viscosity of the polyamide resin (A) is low and, further, due to the acid value being higher than the predetermined value, the state where the reaction with the polyamide-reactive silane coupling agent (C) favorably proceeds is resulted and accordingly that the adhesion of the polyamide resin (A) to the glass fiber bundles (B) becomes strong. However, with regard to the m-xyleneadipamide (a2) of low viscosity, although its fluidity is good, it is very fragile and has a low impact strength and, therefore, when this m-xylyleneadipamide is contained therein, it is preferred that the amount of the terminal carboxyl group is made low and the adding amount is limited so as not to couple with the glass fiber.

In the polyamide resin composition reinforced with the glass fiber of the present invention produced as above, the test piece after the Charpy impact strength test (in accordance with ISO 179-1; cutting notch portion) expresses a specific fracture mode and the ratio of the apparent fractured surface area (SA) to the cross section (SB) of the notch portion is greatly higher than that in the conventional art.

FIG. 1 is diagrams which schematically show a test piece for Charpy impact strength test equipped with a notch portion formed by cutting (1-1), a fractured state of the test piece of Comparative Example after the impact strength test (1-2), and the fractured state of the test piece of the present invention after the impact strength test (1-3), respectively. As will be noted from (1-2), fracture of a test piece of the conventional art (Comparative Examples) proceeds, from the notch portion as a starting point, in a direction of almost in right angles to the lengthwise direction of the test piece and, the fractured surface is within such an extent that a few unevenness is recognized due to the filler, etc. In the test piece of the present invention however, as will be noted from (1-3), although fracture starts from the front end of the notch portion as a starting point, it does not proceed at right angles (width direction) to the lengthwise direction of the test piece but, initially, the fracture proceeds at the angle of not less than 45° from the right angle direction or, rather, nearly in the lengthwise direction and, after that, the fracture once turns and proceeds in the reverse lengthwise direction to the opposite side of the notch portion whereupon a complicated fractured surface is formed. The present inventor has investigated the fracture mode of the test piece after the test and, as a result, he has confirmed that the glass orientation of the Charpy test piece equipped with a cut notch portion and the adhesive property of the glass to the polyamide resin are the causes for expressing the specific fracture mode. Thus, a test piece in which large amount of the glass fiber having a flat cross section is subjected to the surficial orientation and well contacting the polyamide resin shows such a fracture mode where the size of the fractured area calculated from the cracking length (the length from the front end of the notch portion which is the starting point of the fracture to the opposite side of the notch portion) in the fracture and also from the thickness of the test piece becomes the predetermined value or more.

As hereunder, a method for calculating the above-mentioned area ratio of the apparent surface area (SA) of the fractured surface to the cross sectional area (SB) of the notch portion will be illustrated. A picture of the fracture example of the present invention product after the test is shown in (3-1) of FIG. 3. This picture is taken from the above area of the width surface. (4-1) of FIG. 4 shows a picture of the product of Comparative Example. The length of the fractured area which can be read from those pictures is the fractured (cracking) length and the apparent surface area (SA) of the fractured surface is calculated using said length.

Figure 2:
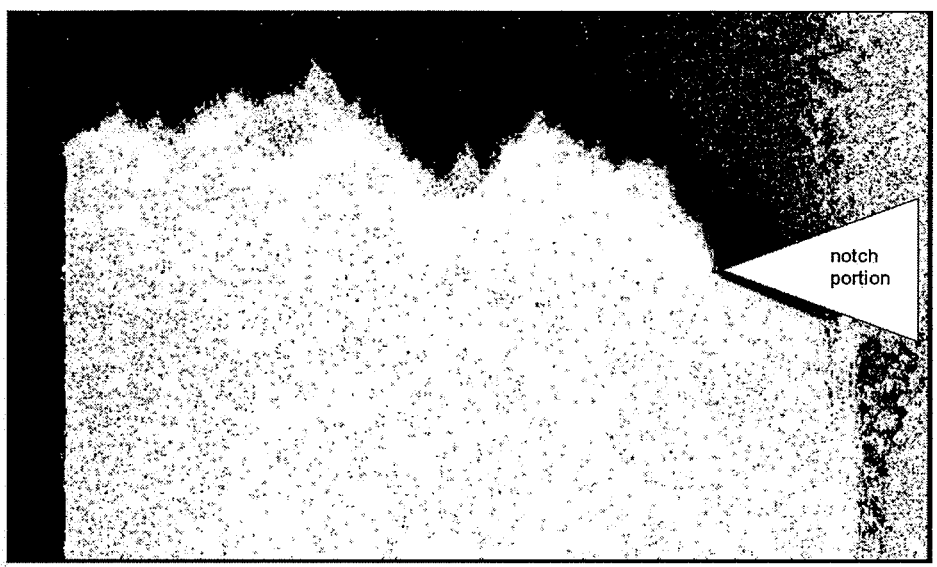
FIG. 2 is a diagram which shows an example of projected image obtained by subjecting the image of the fractured part of the test piece to a binarizing treatment.

The fractured (cracking) length can be measured in such a manner that picture of the test piece after the test is taken from the above area of the width surface using a digital microscope and the length of the fractured area is measured using an image analysis software. To be more specific, an example is that a picture of a fractured test piece to be measured is taken by a digital microscope (KH-7700; manufactured by K. K. Hirox) in 20-fold or less magnifications, the resulting image of the fractured area is binarized using an image analysis software and, for the resulting projected image (refer to FIG. 2), the length from the front end of the notch portion to the opposite side of the notch portion is measured while neglecting the unevenness of not more than about 200 μm. After that, the apparent surface area (SA) of the fractured surface is calculated according to the formula: (fracture (cracking) length)×(thickness of the Charpy impact test piece). Further, the cross sectional area (SB) of the notch portion is calculated according to the formula: (width of the notch portion)×(thickness of the test piece). Then the ratio of (apparent surface area (SA) of the fractured surface)/(cross sectional area (SB) of the notch portion) is determined. Measurement of the fractured (cracking) length is not limited to the above-mentioned method only. In this analytic method for the projected image, there is no possibility to overestimate the apparent fractured area to the actual fractured area as a result of piling up in a thickness direction and, accordingly, there is no lowering in the precision as a parameter for detecting the cracked/fractured mode by the difference in numerals resulted from the measurement error between the projected image and the real cracked length.

Figure 5:
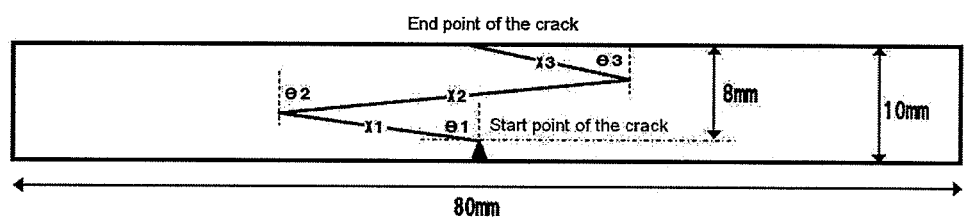
FIG. 5 shows a diagram for cracking angle and cracking length of a test piece after the Charpy impact strength test (5-1) and a Charpy test image (5-2).
Figure 5:
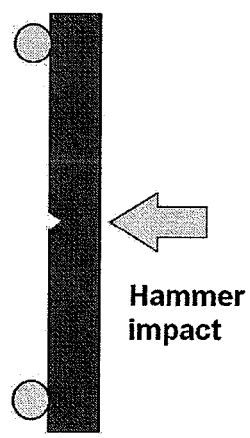

FIG. 5 shows a diagram of the cracked angle and the cracked length of the test piece after the test (5-1) and a Charpy test image (5-2). As shown in (5-2), in the continued cracks from the base point of the crack at the front end of the notch portion to the end point of the crack, when the cracks in the number of n which are different in the proceeding directions are named crack 1, crack 2, ... crack n and the cracked length of the n-th crack is named Xn, then the total length (X) of the continued cracks is calculated as (X1+X2+ ... +Xn). Further, when the proceeding angle of the crack to the impact direction is named θn in each of the cracks n which are different in the proceeding directions, an average cracked angle is calculated as (θ1+θ2+ ... +θn)/n. When the total length of the cracks is K-fold of the width of the notch portion (the area shown by "8 mm" in (5-2)), the area ratio of (apparent surface area (SA) of the fractured surface)/(cross sectional area (SB) of the notch portion) as stipulated by the present invention is K and the average cracked angle can be calculated as $(\theta 1+\theta 2+ \ldots +\theta n)/n=\cos^{-1}(1/K)$. Now the illustration will be made in detail for the fracture state where the area ratio of (apparent fractured surface area (SA) of the fractured surface)/(cross sectional area (SB) of the notch portion) in the Charpy test equipped with cut notch portion is not less than 2.5 as stipulated by the present invention. The fracture state where the area ratio of (apparent fractured surface area (SA) of the fractured surface)/(cross sectional area (SB) of the notch portion) is not less than 2.5 is such a one that the total crack length=(X1+X2+ ... +Xn) is not less than 20 mm and an average cracked angle (θ1+θ2+ ... θn)/n is not less than 66° when the width of the notch portion is 8 mm. As shown in (5-2) of FIG. 5, both ends of the test piece are pushed from the notch portion side and impact is applied from the real back side of the notch portion using a hammer in a Charpy impact test equipped with a cut notch portion. Therefore, the cracked angle usually does not reach 45° or higher. When the width of the notch portion is made 8 mm in case the cracked angle is not more than 45°, the total length of the cracks is about 11 mm or less. In the present invention, the crack upon the fracture is not only constituted from a plurality of cracks having different directions but also their crack angles are significantly larger than 45°. Therefore, cracked length and cracked area become significantly big and, upon the fracture, absorption of energy becomes high. That is a specific fracture mode achieved by the result of a significant enhancement in the surface impact due to the high adding amount of the glass fiber, the surface orientation of the flat glass and the strong adhesive force between the glass and the resin interface.

In the polyamide resin composition of the present invention, the ratio of (apparent surface area (SA) of the fractured surface)/(cross sectional area (SB) of the notch portion) of 2.5 to 5.0 or, preferably, 3.0 to 4.5 can be achieved in the fractured surface of the test piece after the test in a Charpy impact strength test (in accordance with ISO 179-1) equipped with a cut notch portion. When the area ratio is less than the above range, cracking proceeds in parallel to the impact direction upon the fracture and the cracked area becomes small. In that case, the absorption of impact energy upon the fracture of the molded product is low and the product is not useful as a impact-resisting molded product. The upper limit of the above range is nearly the upper limit of the cracked area constituted from the test piece size and the cracked length excluding the case where a plurality of fractured surfaces are formed and the test piece is divided into three or four after the fracture.

The reason why the fractured surface of the test piece of the polyamide resin composition of the present invention after the Charpy impact strength test is very specific is supposed to be that, during the test, the flat surface of the glass fiber is subjected to a surficial orientation in the lengthwise direction of the test piece and also to the surface and moreover that the adhesion of the polyamide to the glass fiber is well high. The surficial orientation of the flat surface of the glass fiber can be confirmed by such a manner that the surface of the notch portion side of the Charpy test piece equipped with a notch portion is abraded to the depth of 2 mm from the surface (the distance to the front end of the notch portion) and the abraded surface is observed under a scanning electron microscope (SEM) or the like.

When the glass fiber having a flat cross section is in a surficial orientation to the surface of the test piece (molded product) and the glass fiber is sufficiently coupled to the resin, the strength of the surface where the flat glass fiber is orientated is high whereby, even if impact is applied, cracking (fracturing) in the vertical direction to this flat glass orientation surface is inhibited and the crack (fracture) is propagated in a resin matrix having the continuity in the surficial direction of the test piece. On the other hand, when the coupling to the resin is not sufficient, the crack (fracture) proceeds in the interface between the resin and the glass and is quickly propagated in the vertical direction to the lengthwise direction of the test piece due to the breakage on the interface between the glass fiber and the resin, to the dropout of the glass fiber, to the stress concentration by the deformation difference to the stress of the resin and the glass fiber having a flat cross section, etc. In the case of the glass fiber having a circular cross section, the glass fiber has no different orientation property caused by the cross section direction even when it is orientated in the lengthwise direction of the test piece unlike the flat cross section and, as a result, the specific propagation of the crack (fracture) as in the case of the present invention does not take place.

Further, when the coupling of the resin with the glass fiber is improved as such, it is now possible to make pellets with the composition having a very high filling rate of the glass having a flat cross section during kneading whereupon it is possible to easily produce the pellets for injection molding which express high bending strength and bending elastic modulus as a result of the highest filling of the glass having a flat cross section. To be more specific, the polyamide resin composition of the present invention is able to achieve the bending strength of not less than 400 MPa and the bending elastic modulus (in accordance with ISO 178) of not less than 23 GPa.

The improving effect for the impact resistance in the polyamide resin composition of the present invention is greatly dependent upon the reinforcing effect for the surficial strength due to the fact that the glass fiber having a flat cross section is surficially orientated and is sufficiently coupled to the resin. This is fundamentally different from the conventional improving method where a modified elastomer having an excellent rubber elasticity or the like is added. In the composition where the impact resistance is improved by the elastomer, its impact resistance suddenly becomes poor at the low temperature being lower than the glass transition point of the elastomer but, in the resin composition of the present invention, it is not relied upon the addition of the elastomer and, as a result, there is no disadvantageous temperature-dependency at the low temperature region but a high impact resistance can be achieved in a stable manner.

EXAMPLES

The present invention will now be illustrated in more detail as hereunder by Examples although the present invention is not limited to the following Examples so far as it does not exceed the gist thereof. Measurement of the physical data in the Examples was carried out in accordance with the following methods.

(1) Relative Viscosity of the Polyamide Resin:

The polyamide resin (0.25 g) was dissolved in 25 ml of 96.3 wt % sulfuric acid, 10 ml of the resulting solution was placed in an Oswald viscometer, measurement was conducted at 20° C. and calculation was done according to the following formula.

$$RV = T/T0$$

RV: Relative viscosity, T: Dropping time of the sample solution, T0: Dropping time of the solvent (2) Concentration of Terminal Carboxyl Group in the Polyamide Resin (CEG):

To 0.2 g of the polyamide resin was added 10 ml of benzyl alcohol followed by dissolving at 180±5° C. for 5 minutes. The solution was cooled for 15 second in water and titrated with an ethanolic potassium hydroxide solution (prepared by adding ethanol to 80 ml of 0.5N KOH to adjust the volume to a 1000 ml solution) using phenolphthalein as an indicator and calculation was conducted according to the following formula.

$$CEG(meq/kg) = \{[(A-B) \times N \times f]/(W \times 1000)\} \times 10^6$$

A: Titrated amount (ml)
B: Blank titrated amount for the solvent (ml)
N: Concentration of ethanolic potassium hydroxide (mol/l)
f: Factor of ethanolic potassium hydroxide
W: Weight of the crystallized polyamide resin (g)

(3) Bending Strength, Bending Elastic Modulus:

These parameters were measured in accordance with ISO 178.

(4) Charpy Impact Strength:

This parameter was measured in accordance with ISO 179-1. As a test piece shape, 1 eA (cut notch portion) was used.

(5) Productivity:

The case where the strand breakage was not generated during pulling out the strand from an extruder and stable pelletization was possible was marked "o" while the case where the frequency of strand breakage was high was marked "x".

(6) Shape of Pellets:

The case where the shape was almost uniform and neither poor opening nor fluffing was noted was marked "o" while the case where poor opening and fluffing of the glass fiber were significant and the pellets thrusted into the molding machine during the molding whereby a poor product was obtained was marked "x". The case where the strand coming out from an extruder was not firm but was swollen whereby the production was not possible at all was evaluated as "no production possible".

(7) Apparent Surface Area (SA) of the Fractured Surface/Cross Sectional Area (SB) of the Notch Portion:

Picture of the test piece fractured by a Charpy impact test was taken using a digital microscope (KH-7700; manufactured by K. K. Hirox) from the above area of the width surface of the test piece in 20-fold magnifications, the image of the fractured (cracking) area was binarized using an analysis software of Digital Microscope Ver. 1.5 and, with regard to the resulting projected image (refer to FIG. 2), the length from the front end of the notch portion to the opposite side of the notch portion was measured while neglecting the unevenness of not more than about 200μ. When the image of the 20-fold enlargement is not within a framework of the screen, the image is divided and the fractured surface length is determined.

After that, the apparent surface area of the fractured surface (SA) was calculated according to the formula: (fracture (cracking) length)×(thickness of the Charpy impact test piece). Incidentally, the apparent surface area (SA) of the fractured surface is an average value of ten test pieces. Further, the cross sectional area (SB) of the notch portion was calculated according to the formula: (width of the notch portion)×(thickness of test piece).

Then the ratio of (apparent surface area (SA) of the fractured surface)/(cross sectional area of the notch portion (SB)) was calculated.

The polyamides (A) used:
(a1A) Polyamide 6 having a relative viscosity or RV (that in 96% sulfuric acid solution; ditto) of 1.9; "Nylon T-860" manufactured by Toyobo; concentration of terminal carboxyl group (CEG)=80
(a1B) Polyamide 6 having a relative viscosity or RV of 2.4; "Nylon T-840" manufactured by Toyobo; CEG=65
(a1C) Polyamide 6 having a relative viscosity or RV of 3.1; "Nylon T-800" manufactured by Toyobo; CEG=65
(a1D) Polyamide 66 having a relative viscosity or RV of 2.4; "Stabamide 23AE" manufactured by Rhodia; CEG=91
(a2A) Polyamide MXD6 having a relative viscosity or RV of 2.1; "Nylon T 600" manufactured by Toyobo; CEG=65
(a2B) Polyamide MXD6 having a relative viscosity or RV of 1.7; "Nylon T 640" manufactured by Toyobo; CEG=35
(a2C) Polyamide 6T6I having a relative viscosity or RV of 2.0; "Glyboly G21" manufactured by Ems; CEG=87

The glass fiber (B) used:
(b1) "CSG3PA820S" manufactured by Nittobo as a chop strand of glass fiber having a flat cross section; flatness degree: 4; short diameter: 7 μm; fiber length: 3 mm; ignition loss at 625° C. for 0.5 hour: 0.54% by weight
(b2) "MAFT2A" manufactured by Owens Corning as a chop strand of glass fiber having a circular cross section; diameter: 13 μm; fiber length: 3 mm; ignition loss at 625° C. for 0.5 hour: 0.51% by weight The coupling agent (C) used:
(c1) "KBE 903" manufactured by Shin-Etsu Chemical as an aminosilane coupling agent
(c2) "KBM 403" manufactured by Shin-Etsu Chemical as an epoxysilane coupling agent Other components (D) used
Releasing agent: Montanate wax "WE 40" manufactured by Clariant
Stabilizer: "Irganox B1171" manufactured by CIBA Speciality Chemicals
Impact resistance improving agent (Maleic acid-modified elastomer): "Tafiner MA8510" manufactured by Mitsui Chemicals
Crystal nucleating agent: Layered silicate (organically processed montmorillonite), "Cloisite 30B" manufactured by Southern Clay Products Examples 1 to 10 and Comparative Examples 1 to 9

The polyamide resin (A) and other component (D) were subjected to dry blending under the compounding ratios as shown in Tables 1 and 2 and subjected to the melt mixing under the extruding condition where the cylinder temperature was 280° C. and the screw revolution was 280 rpm using a biaxial extruder "STS 35 mm" (constituted from 12 blocks of barrel) which was a biaxial extruder of a bent type manufactured by Coperion and, after that, the glass fiber (B) was fed by a side feeding system to conduct a melt kneading. In the case of addition of a coupling agent, any of the following method (I) and (II) was adopted: (I) a method where the coupling agent is added as a liquid from a block immediately after the pouring of the glass fiber (B) and (II) a method where the coupling agent is dry-blended together with the polyamide resin (A) and other component (D) and then poured from a main hopper. In Example 1 and Comparative Example 6, a layered silicate which is known to be useful as a crystal nucleating agent was added. In Example 6, there was used the polyamide 6 master in which layered silicate was previously dispersed in polyamide 6 so as to meet the ratio shown in the table. In Comparative Example 6, a swelling layered silicate was dry-blended in a main hopper so as to meet the ratio shown in the table and then poured. The strand extruded from the extruder was quickly cooled and made into pellets using a strand cutter. The resulting pellets were dried at 100° C. for 12 hours, made into test pieces for various tests using an injection molding machine (IS80 manufactured by Toshiba Machine) at the cylinder temperature of 285° C. and the metal die temperature of 140° C. and then subjected to the evaluation. The result of the evaluation is also mentioned in Tables 1 and 2.

TABLE 1

|     |     |     |     | Ex. 1 | Ex. 2 | Ex. 3 | Ex. 4 | Ex. 5 | Ex. 6 | Ex. 7 | Ex. 8 | Ex. 9 | Ex. 10 |
|---|---|---|---|---|---|---|---|---|---|---|---|---|---|
| (A) | a1A | RV1.9 polyamide 6 | parts by weight |  |  |  |  | 11 | 10 | 17 |  |  |  |
|  | a1B | RV2.4 polyamide 6 | parts by weight |  |  |  |  |  |  |  |  |  |  |
|  | a1C | RV3.1 polyamide 6 | parts by weight |  |  |  |  |  |  |  |  |  | 10 |
|  | a1D | RV2.4 polyamide 66 | parts by weight | 3 | 5 | 7 | 11 |  |  | 3 | 3 | 3 |  |
|  | a2A | RV2.1 polyamide MXD6 | parts by weight | 22 | 23 | 24 |  | 15 |  | 22 | 22 | 22 | 20 |
|  | a2B | RV1.7 polyamide MXD6 | parts by weight | 5 | 6 | 7 |  | 5 |  | 5 | 5 | 5 | 5 |
|  | a2C | RV2.0 polyamide 6T6I | parts by weight |  |  |  | 8 |  | 8 |  |  |  |  |
| (B) | b1 | Glass fiber having flat cross section | parts by weight | 70 | 66 | 62 | 70 | 70 | 75 | 70 | 70 | 70 | 65 |
|  | b2 | Glass fiber having circular cross section | parts by weight |  |  |  |  |  |  |  |  |  |  |
| (C) | c1 | Aminosilane coupling agent | parts by weight | 0.2 | 0.2 | 0.2 | 0.2 | 0.2 | 0.2 |  | 0.4 | 0.1 | 0.2 |
|  | c2 | Epoxysilane coupling agent | parts by weight |  |  |  |  |  |  | 0.2 |  |  |  |

TABLE 1-continued

|  |  |  | Ex. 1 | Ex. 2 | Ex. 3 | Ex. 4 | Ex. 5 | Ex. 6 | Ex. 7 | Ex. 8 | Ex. 9 | Ex. 10 |
|---|---|---|---|---|---|---|---|---|---|---|---|---|
| (D) | Releasing agent | parts by weight | 0.3 | 0.3 | 0.3 | 0.3 | 0.3 | 0.3 | 0.3 | 0.3 | 0.3 | 0.3 |
|  | Stabilizer | parts by weight | 0.3 | 0.3 | 0.3 | 0.3 | 0.3 | 0.3 | 0.3 | 0.3 | 0.3 | 0.3 |
|  | Impact resistance improving agent | parts by weight |  |  |  |  |  |  |  |  |  |  |
|  | Crystal nucleating agent | parts by weight |  |  |  |  |  |  |  |  |  | 0.3 |
| Adding method of the coupling agent (C) | | — | I | I | I | I | I | I | I | I | I | I |
| Bending strength | | MPa | 530 | 500 | 520 | 480 | 502 | 480 | 470 | 510 | 460 | 400 |
| Bending elastic modulus | | GPa | 28.8 | 27.6 | 30 | 25.5 | 26.3 | 28.8 | 28.5 | 29 | 28.1 | 28 |
| Charpy impact strength (23° C.) | | kJ/m$^2$ | 38 | 35 | 33 | 38 | 35 | 35 | 26 | 36 | 29 | 22 |
| Charpy impact strength (−40° C.) | | kJ/m$^2$ | 40 | 38 | 35 | 43 | 36 | 39 | 28 | 39 | 34 | 24 |
| Charpy test: (SA)/(SB) area ratio | | — |  | 3.6 | 3.1 | 3.5 | 3.1 | 3.0 | 3.3 | 3.0 | 4.1 | 2.9 | 3.2 |
| Shape of pellets | | — |  | ○ | ○ | ○ | ○ | ○ | ○ | ○ | ○ | ○ | ○ |
| Productivity | | — |  | ○ | ○ | ○ | ○ | ○ | ○ | ○ | ○ | ○ | ○ |

TABLE 2

|  |  |  |  | Comp. Ex. 1 | Comp. Ex. 2 | Comp. Ex. 3 | Comp. Ex. 4 | Comp. Ex. 5 | Comp. Ex. 6 | Comp. Ex. 7 | Comp. Ex. 8 | Comp. Ex. 9 |
|---|---|---|---|---|---|---|---|---|---|---|---|---|
| (A) | a1A | RV1.9 polyamide 6 | parts by weight |  |  |  |  |  |  | 13 | 11 |  |
|  | a1B | RV2.4 polyamide 6 | parts by weight |  |  |  |  |  |  |  |  | 47 |
|  | a1C | RV3.1 polyamide 6 | parts by weight |  |  |  |  |  | 10 |  |  |  |
|  | a1D | RV2.4 polyamide 66 | parts by weight | 8 | 2 | 3 | 3 | 3 |  | 12 | 11 |  |
|  | a2A | RV2.1 polyamide MXD6 | parts by weight | 30 | 5 | 22 | 22 | 22 | 20 |  |  |  |
|  | a2B | RV1.7 polyamide MXD6 | parts by weight | 12 | 3 | 5 | 5 | 5 | 5 |  |  |  |
|  | a2C | RV2.0 polyamide 6T6I | parts by weight |  |  |  |  |  |  | 10 | 8 |  |
| (B) | b1 | Glass fiber having flat cross section | parts by weight | 50 | 90 | 70 | 70 | 70 | 65 |  |  |  |
|  | b2 | Glass fiber having circular cross section | parts by weight |  |  |  |  |  |  | 65 | 70 | 45 |
| (C) | c1 | Aminosilane coupling agent | parts by weight | 0.2 | 0.2 |  | 0.8 | 0.2 | 0.2 | 0.2 | 0.2 | 0.2 |
|  | c2 | Epoxysilane coupling agent | parts by weight |  |  |  |  |  |  |  |  |  |
| (D) | Releasing agent | | parts by weight | 0.3 | 0.3 | 0.3 | 0.3 | 0.3 | 0.3 | 0.3 | 0.3 | 0.3 |
|  | Stabilizer | | parts by weight | 0.3 | 0.3 | 0.3 | 0.3 | 0.3 | 0.3 | 0.3 | 0.3 | 0.3 |
|  | Impact resistance improving agent | | parts by weight |  |  |  |  |  |  |  |  | 0.3 |
|  | Crystal nucleating agent | | parts by weight |  |  |  |  |  | 0.3 |  |  |  |
| Adding method of the coupling agent (C) | | | — | I | I | — | I | II | II | I | I | I |
| Bending strength | | | MPa | 345 | — | — | — | — | 140 | 370 | — | 240 |
| Bending elastic modulus | | | GPa | 15.5 | — | — | — | — | 21 | 21 | — | 11.7 |
| Charpy impact strength (23° C.) | | | kJ/m$^2$ | 16.2 | — | — | — | — | 9 | 18 | — | 27 |
| Charpy impact strength (−40° C.) | | | kJ/m$^2$ | 15.5 | — | — | — | — | 9 | 17 | — | 10 |
| Charpy test: (SA)/(SB) area ratio | | | — | 2.0 | — | — | — | — | 1.2 | 1.8 | — | 1.5 |
| Shape of pellets | | | — | — | ○ | — | — | — | — | ○ | ○ | — | ○ |
| Productivity | | | — | ○ | No production possible | No production possible | No production possible | No production possible | ○ | ○ | No production possible | ○ |

As will be apparent from Tables 1 and 2, the test pieces of Examples 1 to 10 are excellent in all terms of bending strength, bending elastic modulus and Charpy impact strength (at 23° C. and −40° C.) and, moreover, the area ratio of (SA)/(SB) in the Charpy test piece showing that the fractured area was more than a predetermined value was also high. In addition, the shape of the pellets was also good and the productivity was excellent. On the contrary, the test pieces of Comparative Examples 1 to 9 showed inferior to those of Examples 1 to 10 in any of the evaluating items.

When no coupling agent (C) was newly added as shown in Comparative Example 3 or when a coupling agent (C) was excessively added as shown in Comparative Example 4, production of a molded product into which the glass fiber bundles having flat cross sections were highly filled was not possible.

Further, when a coupling agent (C) was not directly added to the melt kneaded resin as shown in Comparative Examples 5 and 6, production was difficult or impossible.

In Comparative Examples 2 to 5 and 8, firmness of the strand coming out from an extruder was poor and the strand was swollen and cannot be taken off whereupon the production was not possible at all. In the case of the glass fiber having a flat cross section, the fiber was bulky and degassing was poor and, when the adhesive property to the polyamide was poor, such a phenomenon happens upon the high filling. In Comparative Example 6 where a layered silicate was added as a crystal nucleating agent, although the strand cannot be taken off, no adhesion of the glass fiber to the polyamide took place at all since the adding method of the coupling agent was not appropriate and the physical property values and the ratio of (SA)/(SB) were significantly low as well.

In Comparative Example 9, although the impact resistance at 23° C. was improved by addition of impact resistance improving agent, the impact resistance at low temperature (−40° C.) became low. Enhancement of the impact resistance of the matrix by addition of impact resistance improving agent (elastomer) gives deflection to the resin matrix and, therefore, it increases the deformation in the impact direction in a Charpy impact equipped with the cut notch portion. Accordingly, the crack proceeds in the impact direction and the (SA)/(SB) value is also low.

In Comparative Examples 7 and 8, the bending elastic modulus did not reach the levels of the Examples even when the adding amount of the glass fiber having a circular cross section was increased and, moreover, extrusion was not possible in Comparative Example 8. The glass fiber having a circular cross section shown in the table had more fiber numbers per weight than the glass fiber having a flat cross section and the fiber was also fine and, as a result, the fiber was apt to be broken during compounding and the fluid resistance due to interference of fibers was more than that in the case of the glass fiber having a flat cross section whereupon the production was not possible.

Figure 3:
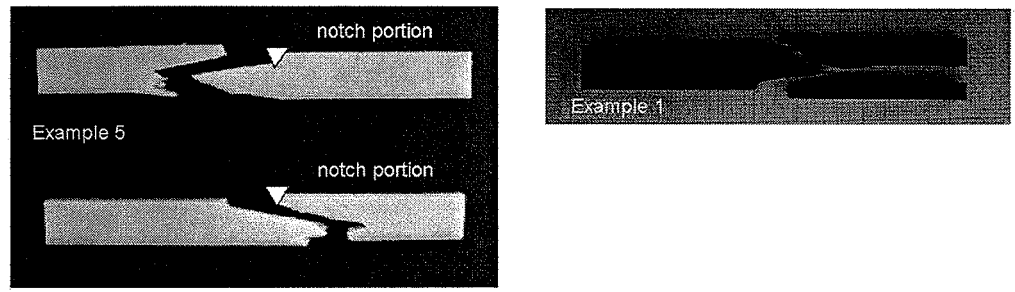
FIG. 3 shows examples of the fracture of the test piece for Charpy impact strength test of the present invention. (3-1) is a photograph which is a substitute for a drawing showing the example of fracture of the product of the present invention (Example 1), (3-2) is a scanning electron microscopic (SEM) photograph showing the state of the fractured surface of the fracture example and (3-3) are SEM photographs which show the state of glass fiber on the fractured surface with varying enlarged ratios.
Figure 3:
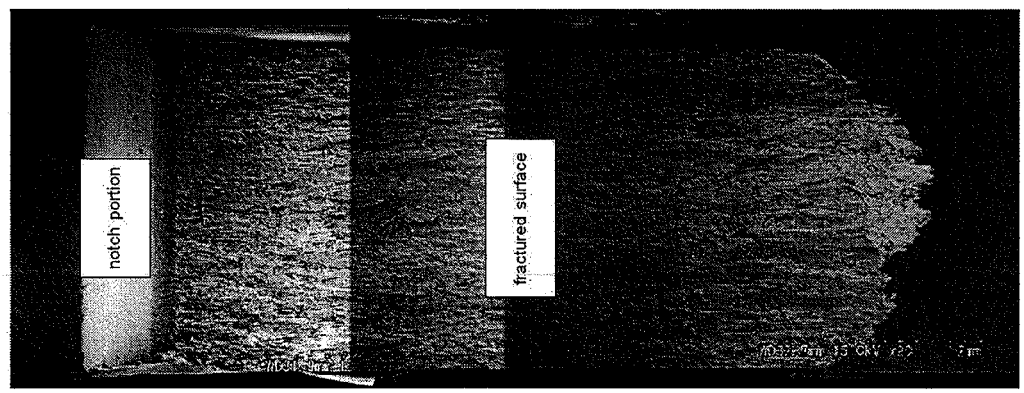
Figure 3:
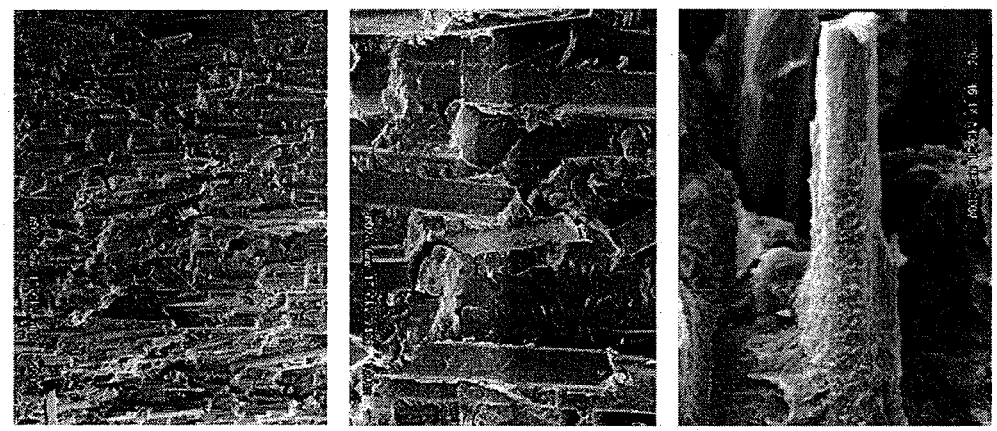
Figure 4:
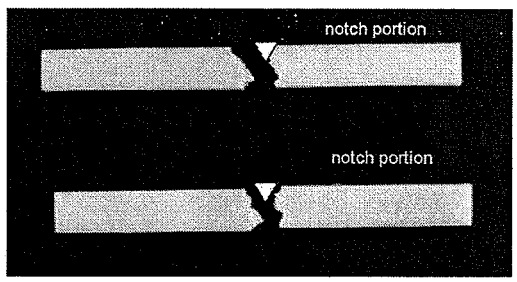
FIG. 4 shows examples of the fracture of the test piece for Charpy impact strength test of Comparative Example. (4-1) is a photograph which is a substitute for a drawing showing the example of fracture of Comparative Example 5, (4-2) is a SEM photograph showing the state of the fractured surface of the fracture example and (4-3) are SEM photographs which show the state of glass fiber on the fractured surface with varying enlarged ratios.
Figure 4:
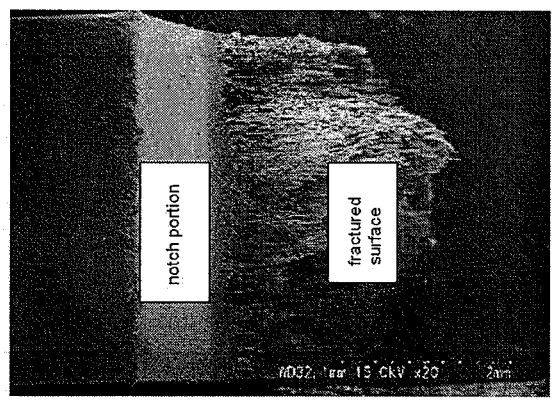
Figure 4:
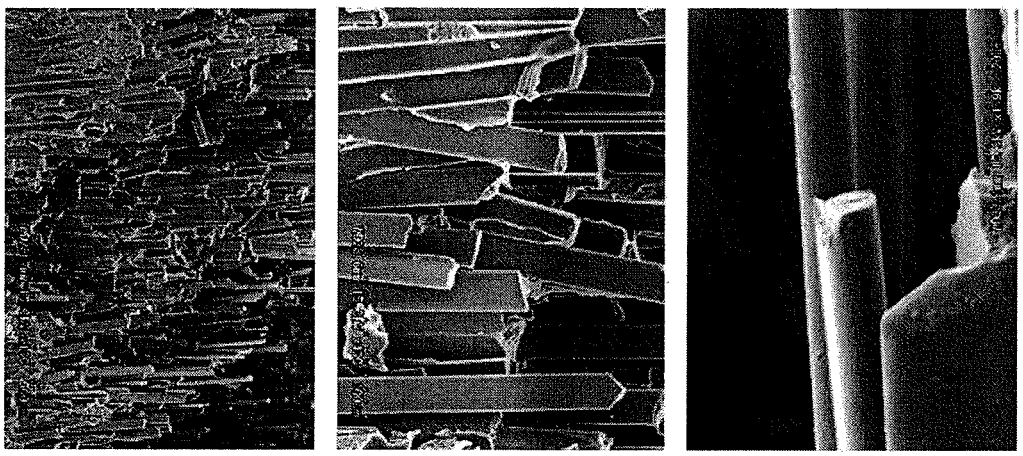

The picture under an electron microscope of the fractured surface of the test piece for Charpy impact strength test of Example 1 is shown in FIG. 3. In the fractured surface, the flat surfaces of the glass fiber well coated with the resin is noted. The resin and the glass having a flat cross section formed a strong coupling and the glass fiber having a flat cross section orientated in the surficial direction was strongly adhered to the polyamide whereupon the reinforcing effect for the surface was specifically high and the state where the cracks were propagated in the orientation surface direction can be confirmed.

On the other hand, the picture under an electron microscope of the fractured surface of the test piece for Charpy impact strength test of Comparative Example 6 is shown in FIG. 4. In spite of the fact that a coupling agent was compounded with the composition, it is noted that the glass fiber exposed on the fractured surface was rarely wetted with the resin of the matrix. Accordingly, there was no reinforcing effect at all due to the flat surface of the glass fiber whereby it can be understood why the mechanical characteristics and impact characteristics were significantly inferior in Comparative Example 6.

INDUSTRIAL APPLICABILITY

The polyamide resin composition of the present invention expresses not only very high bending strength and bending elastic modulus as well as impact resistance data but also the specific fracture mode that the fractured area upon impact is not less than 2.5-fold of the cross section of the molded product and, due to the high rigidity as such, the composition is most appropriate for the boxes/cases for electronic/electric devices such as mobile phone or personal computers and also for electronic/electric equipments for automobiles. Further, since the resin composition of the present invention uses the glass fiber having a flat cross section by which the deformation is highly suppressed, the dimensional precision as a box/case is also quite significant.

The invention claimed is:

1. A polyamide resin composition reinforced with glass fiber produced by the melt kneading of a mixture where 66 to 80 parts by weight of glass fiber bundles (B) comprising a glass fiber having a flat cross section whose flatness degree is 1.5 to 8 and having an ignition loss at 625° C. for 0.5 hour of not more than 0.8% by weight are added to 34 to 20 parts by weight of polyamide (A), characterized in that, during the above melt kneading, a polyamide-reactive silane coupling agent (C) is added to the above mixture in a rate of 0.1 to 1.0% by weight of the above glass fiber bundles (B),
    wherein the polyamide resin (A) is constituted from an aliphatic polyamide (a1) and a polyamide (a2) containing aromatic components, and their constituting ratio by weight is (5 to 95):(95 to 5), and
    wherein the polyamide resin composition does not contain a flame retardant.

2. The polyamide resin composition reinforced with glass fiber according to claim 1, wherein the polyamide (a2) containing the aromatic components contains poly-m-xylylene adipamide which has a relative viscosity in a 96% sulfuric acid solution of 1.4 to 1.8 and has a terminal carboxyl group concentration of not higher than 50 meq/kg.

3. The polyamide resin composition reinforced with glass fiber according to claim 1, wherein the aliphatic polyamide (a1) contains polycaproamide which has a relative viscosity in a 96% sulfuric acid solution of 1.4 to 2.0 and has a terminal carboxyl group concentration of 55 to 95 meq/kg.

4. The polyamide resin composition reinforced with glass fiber according to claim 1, wherein the bending elastic modulus (in accordance with ISO 178) is not less than 23 GPa.

5. The polyamide resin composition reinforced with glass fiber according to claim 1, wherein, in the fractured surface of the test piece of the polyamide resin composition reinforced with glass fiber after the Charpy impact strength test (in accordance with ISO 179-1; cutting notch portion), the area ratio of the apparent surface area (SA) of the fractured surface to the cross sectional area (SB) of the notch portion is not less than 2.5;
    the apparent surface area (SA) of the fractured surface: area which is calculated by (fracture length from the front end of the notch portion to the opposite side surface of the notch portion)×(thickness of the test piece); and
    the cross sectional area (SB) of the notch portion: area which is calculated by (width of the notch portion)×(thickness of the test piece).

6. The polyamide resin composition reinforced with glass fiber according to claim 2, wherein the aliphatic polyamide (a1) contains polycaproamide which has a relative viscosity in a 96% sulfuric acid solution of 1.4 to 2.0 and has a terminal carboxyl group concentration of 55 to 95 meq/kg.

7. The polyamide resin composition reinforced with glass fiber according to claim 2, wherein the bending elastic modulus (in accordance with ISO 178) is not less than 23 GPa.

8. The polyamide resin composition reinforced with glass fiber according to claim 3, wherein the bending elastic modulus (in accordance with ISO 178) is not less than 23 GPa.

9. The polyamide resin composition reinforced with glass fiber according to claim 2, wherein, in the fractured surface of the test piece of the polyamide resin composition reinforced with glass fiber after the Charpy impact strength test (in accordance with ISO 179-1; cutting notch portion), the area ratio of the apparent surface area (SA) of the fractured surface to the cross sectional area (SB) of the notch portion is not less than 2.5;
    the apparent surface area (SA) of the fractured surface: area which is calculated by (fracture length from the front end of the notch portion to the opposite side surface of the notch portion)×(thickness of the test piece); and
    the cross sectional area (SB) of the notch portion: area which is calculated by (width of the notch portion)×(thickness of the test piece).

10. The polyamide resin composition reinforced with glass fiber according to claim 3, wherein, in the fractured surface of the test piece of the polyamide resin composition reinforced with glass fiber after the Charpy impact strength test (in accordance with ISO 179-1; cutting notch portion), the area ratio of the apparent surface area (SA) of the fractured surface to the cross sectional area (SB) of the notch portion is not less than 2.5;

the apparent surface area (SA) of the fractured surface: area which is calculated by (fracture length from the front end of the notch portion to the opposite side surface of the notch portion)×(thickness of the test piece); and the cross sectional area (SB) of the notch portion: area which is calculated by (width of the notch portion)×(thickness of the test piece).

11. The polyamide resin composition reinforced with glass fiber according to claim 1, wherein the composition has a bending strength of not less than 400 MPa.

\* \* \* \* \*